Jan. 16, 1940.  W. G. NOACK  2,187,627

COMBUSTION, HEAT-TRANSFER, AND GAS PURIFICATION PLANT

Filed Feb. 26, 1936  2 Sheets-Sheet 1

Inventor
Walter Gustav Noack
per Karl A. May
Attorney.

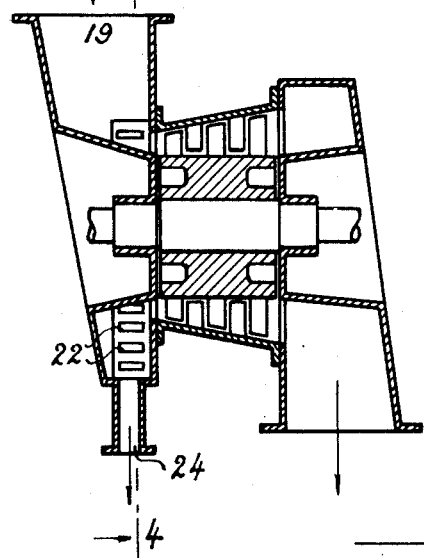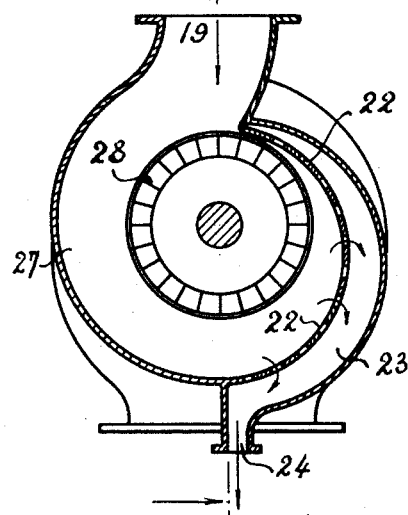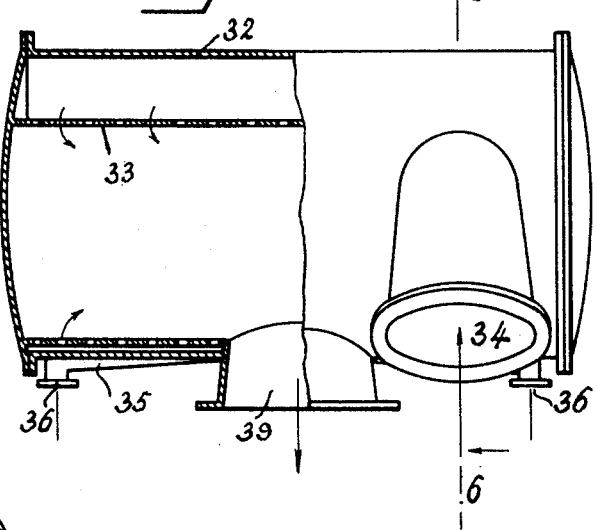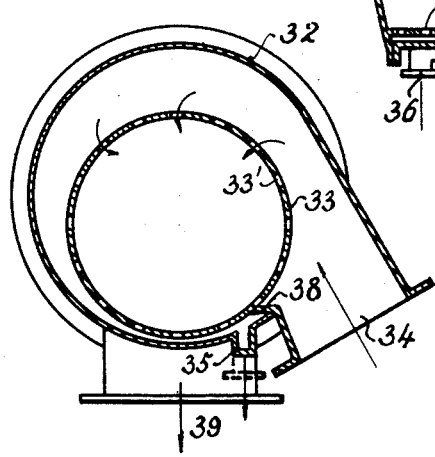

UNITED STATES PATENT OFFICE 2,187,627

COMBUSTION, HEAT-TRANSFER, AND GAS PURIFICATION PLANT

Walter Gustav Noack, Baden, Switzerland, assignor to Aktiengesellschaft Brown, Boveri & Cie., Baden, Switzerland, a corporation Application February 26, 1936, Serial No. 65,814
In Germany March 1, 1935

2 Claims. (Cl. 110—104)

The present invention relates to dust separators, particularly to dust separators in combination with pulverized fuel fired heat transfer plants.

Due to the fineness of the fuel and the velocity of the combustion gases in plants fired with pulverized fuel, there is always a certain amount of ashes, clinkers and coke moved along with the heating gases and leaving the plants through the stack. It has been proposed to removed unburnt and non-combustible material in the combustion chamber by sudden diversion of the stream of the combustion gases or by providing dust separators of the cyclone or a similar type at the end of the boiler flues for removing at least the coarser particles from the gases just before they exhaust into the atmosphere. In plants in which combustion takes place at a pressure which is equal to or only little different from atmospheric pressure, there is little energy available in the combustion gases for separating solid particles, and the separation is inefficient or special blowers must be provided the power consumption of which considerably reduces the overall efficiency of the plant. If provisions for removing unburnt particles are arranged in or right adjacent to the combustion chamber, the particles are very hot if not liquid and therefore difficult to handle, and there is great possibility that not only non-combustible but also unburnt fuel is removed which greatly reduces the efficiency of the plant.

It is an object of the present invention to provide a heat transfer plant having a separator for removing fly ash and fly coke interposed between individual parts of said plant and not in the combustion chamber or in the uptake of said plant.

In a plant according to the object set forth in the paragraph next above, the particles to be separated are cooled and hardened to such an extent that they do not form nests and can easily be handled, and dust particles are not carried through all parts of the heat exchange plant and cannot settle down at undesired places. In plants having pressure fired combustion chambers in which combustion takes place at a pressure which is above atmospheric pressure and in which plants the pressure in the combustion chamber is maintained by the use of a compressor which is preferably driven by means of a gas turbine which is operated by the gases produced in said plant, great amounts of energy are available for the separation process, and the efficiency of the plant is not reduced by the operation of dust separators.

It is, therefore, an object of the present invention to provide a heat transfer plant having a pressure fire combustion chamber in which heating gases of high pressure are produced and having a separator for removing fly ash and fly coke and/or coal, said separator being interposed between individual parts of said plant and not in the combustion chamber or in the uptake of said plant, said separator being operated with the use of the pressure energy of said high pressure heating gas.

If there is a gas turbine connected with the plant which is operated by hot gases generated in the combustion chamber of said plant, and if the separator is arranged ahead of said turbine with respect to the gas flow, the blading of the turbine is protected from dust particles which otherwise have a very undesirable grinding effect in the blades. In the case of a pulverized coal fired combustion chamber in combination with a steam generator, the most suitable place for the generator is immediately after the steam superheater with respect to the gas flow. The gases pass through the superheater at high velocity, and this velocity is—according to the present invention—used for effecting the dust separation, and no additional gas pressure is needed for generating such velocity.

Another object of the present invention resides in the provision of a heat transfer plant having a pressure fire combustion chamber in which heating gases of high pressure are produced and comprising a plurality of heat transfer parts and a gas turbine operated by said high pressure heating gases and a separator for removing fly ash and fly coke interposed between individual parts of said plant and/or a separator integral with said gas turbine and using the high gas velocity required for the operation of said turbine also for operating said separator.

A further object of this invention is to provide a plant according to any of the foregoing objects and having means for conducting the dust removed in said separators, which dust consists of fly ash and unburnt coal and coke particles, back into the combustion chamber of said plant for giving said unburnt particles a further chance to be burnt and produce useful heat.

The great importance and the economic advantage of the method of separating solid particles from gases according to the present invention resides in the fact that, by locating the separator in between heat transfer parts of the plant and/or ahead of a turbine operated by the gas to be cleaned, the high gas velocity which is desirable for obtaining best heat transfer conditions and/or required in the turbine can also be used for operating the separator and need not be specially created, for example, by means of additional blowers. The retransportation of unburnt particles separated into the pulverizer and/or combustion chamber assures that, also at inefficient combustion, no unburnt combustibles are lost and only very fine dust consisting substantially of non-combustibles only, which is not harmful to the turbine blading and does not pollute the atmosphere, enters the turbine and/or is blown into the atmosphere.

Further and other objects of the present invention will be hereinafter set forth in the accompanying specification and claims and shown in the drawings which, by way of illustration, show what I now consider to be a preferred embodiment of my invention.

In the drawings:

Fig. 3 is a longitudinal sectional view of the gas turbine 20 shown in Fig. 1.

Fig. 4 is a transverse sectional view of the gas turbine included in Fig. 1 and taken along line 4—4 in Fig. 3.

Fig. 5 is a longitudinal part sectional view of a modified gas separator according to my invention.

Fig. 6 is a cross sectional view of a gas separator according to Fig. 5 and taken along line 6—6 of Fig. 5.

Like parts are designated by like numerals in all figures of the drawings.

Figure 1:
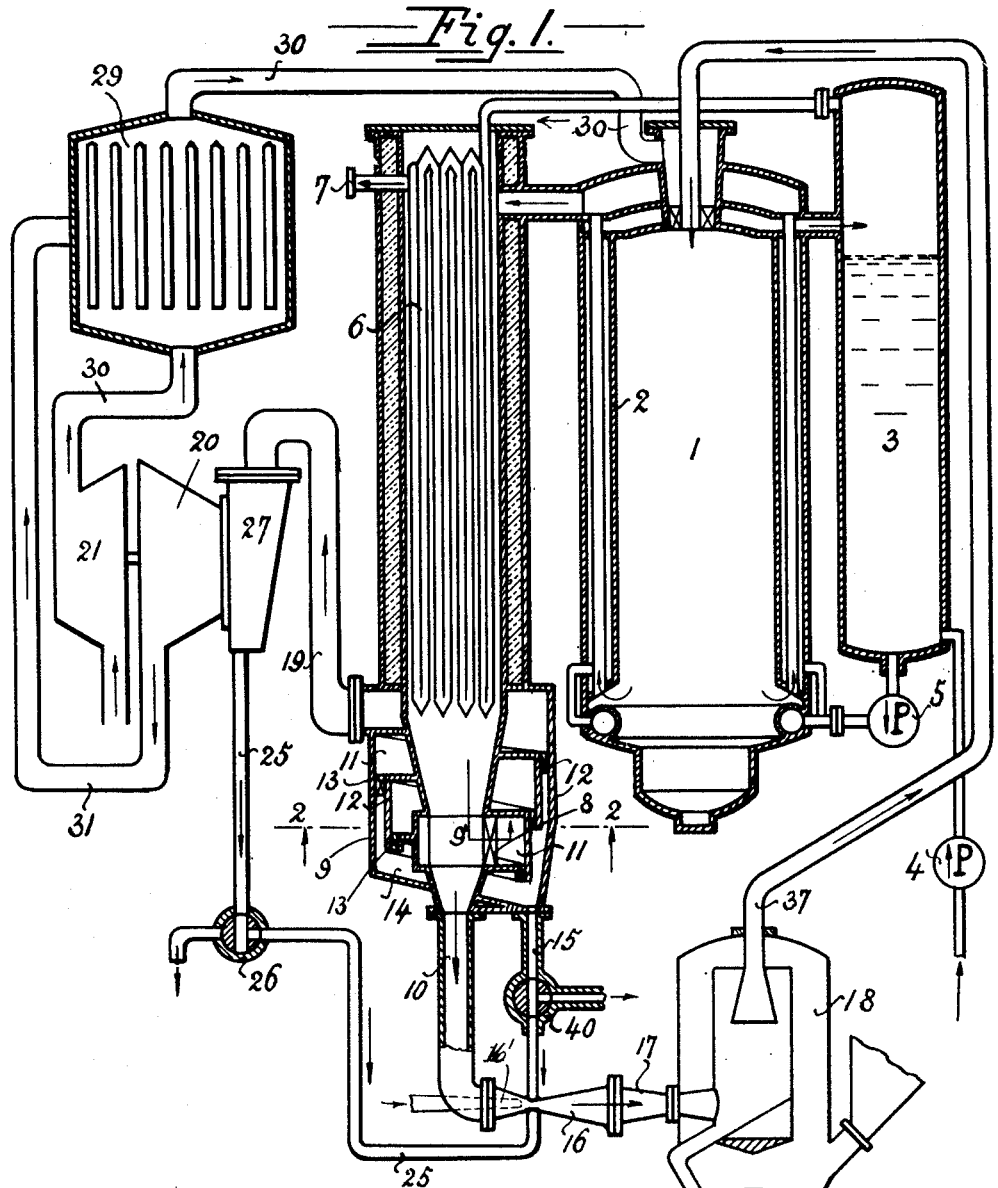
Figure 1 is a diagrammatic layout of a plant according to the present invention.
Figure 2:
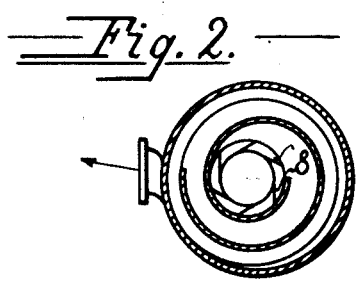
Fig. 2 is a cross sectional view of the dust separator 9 included in Fig. 1 and taken along 2—2 of Fig. 1.

Referring more particularly to Fig. 1 of the drawings: 1 is the pulverized fuel fired combustion chamber of a steam boiler which may be built according to the one disclosed in U. S. Patent 1,948,539 and in which combustion takes place at high pressure. 2 are heating elements, and 3 is the evaporating chamber. The water is fed into chamber 3 by means of pump 4 and circulated from chamber 3 into and through elements 2 by means of circulating pump 5, hot water and steam flow back into chamber 3 wherein steam only collects in the upper part and is conducted into superheater 6 wherefrom the superheated steam is conducted through outlet 7 into a steam main which is not shown. The hot combustion gases developed in chamber 1 pass from said chamber at high velocity through the superheater 6 and enter thereafter dust separator 9 through channels 8 in which the gases are diverted by 90 degrees and a rotating motion is imparted to the gases (see also Fig. 2). The sharp diversion alone causes coarser particles of ash or unburnt fuel to be thrown out which may be removed through conduit 10. From channels 8, the gases move upwards through a channel 11 which is wound in screw-like manner around the central inlet duct 9' of the separator. Along the outer wall 12 and at the lower end thereof, outlet openings 13 are provided through which solid particles which are thrown against wall 12 drop out of channel 11 into chamber 14 and are removed therefrom through outlet 15. The latter may terminate into an ejector 16 arranged in conduit 10. Ejector 16 is provided with a nozzle 16' through which nozzle compressed air or gas is introduced. The solid particles removed in the separator 9 may be conducted through conduit 17 back into the pulverizer 18 which is of conventional construction or as shown in my Patent No. 2,055,385 and is operated by compressed air or gas supplied through conduit 18'.

A two-way valve 40 may be arranged in conduit 15 permitting the removal of the fine particles and allowing only the coarse particles which consists chiefly of unburnt coal and coke to move through conduit 10 and to be returned to the pulverizer 18 for being ground once more and then reintroduced into the combustion chamber for further combustion.

From pulverizer 18, the pulverized fuel is conducted through conduit 37 into combustion chamber 1.

After having been freed from solid particles, the gases are conducted through conduit 19 into gas turbine 20 which is shown on larger scale and in section in Figs. 3 and 4. This turbine operates compressor 21 which—through conduit 30—supplies high pressure combustion air to combustion chamber 1. The exhaust of turbine 20 may be used for heating the combustion air in an air preheater 29 arranged in conduit 30. A plate type air preheater has been shown for convenience which is connected with the exhaust end of turbine 20 by means of gas conduit 31.

Turbine 20 is also provided with a dust separator to remove solid particles which may still be in the operating gases before said gases enter the blading of the turbine. For this purpose, the intake conduit of the turbine is arranged as a spiral 27, as is obvious from Fig. 4 of the drawings, and part of the outer wall of said spiral is provided with openings 22; outside of said openings an annular chamber 23 is arranged in which the dust particles are collected. Chamber 23 is provided with an outlet 24 which—by means of conduit 25—may also be connected with ejector 16 so that, if there is still unburnt fuel dust with the separated particles, this is again conducted into the furnace (see Fig. 1). A valve 26 may be provided in conduit 25 to permit removal of separated dust from the plant is desired. The gases which have already attained high speed circular motion in spiral conduit 27 then enter the turbine nozzles 28 and pass through the turbine in the conventional manner.

Instead of, or in series with separator 9, a separator according to Figs. 5 and 6 may be provided. This separator consists of a drum-shaped part 32 in the lower part of which—excentrically—a perforated cylinder 33 is situated. The gases enter part 32 through inlet conduits 34 in a direction which is tangential to the circumference of part 32 and attain a high speed circular motion. This is augmented by the flow resistance and the reduction of the cross section available for the gas flow caused by cylinder 33; solid particles are, therefore, thrown by centrifugal force against the interior wall of drum 32 and roll downwards and into troughs 35 which are arranged near the bottom of drum 32 and slope towards the ends of the drum and into outlets 36. Dust collection in troughs 35 is further facilitated by the provision of a locking plate 38 between cylinder 33 and drum 32. The cleaned gases pass centripetally through the openings 33' of cylinder 33 into the interior thereof and therefrom into outlet 39 which is connected to cylinder 33. In the embodiment of the invention shown in Fig. 5, two gas inlets 34 are provided and one gas outlet in the center of drum 32 and between the inlets 34 so that the gases travel towards the longitudinal center of the separator, whereas the dust outlets are situated at the extreme ends of drum 32 and the dust travels to a certain extent in opposite direction to the travel direction of the gases.

While I believe the above described embodiments of my invention to be preferred embodiments, I wish it to be understood that I do not desire to be limited to the exact details of process, design and construction shown and described, for obvious modifications will occur to a person skilled in the art.

I claim:

1. A heat-transfer plant comprising a pulverized fuel fired combustion chamber in which hot gases are produced, a plurality of heat consuming means connected to said combustion chamber and receiving hot gases therefrom for their operation, a dust separator for separating fly ash and unburnt coal and coke particles from said hot gases, said separator being interposed between said heat consuming means with respect to the gas flow for removing solid particles from said gases after their temperature has been reduced in one of said means and before they enter another of said means, a pulverizer connected to said combustion chamber for pulverizing and delivering the fuel for firing said combustion chamber, and a conduit connecting said dust separator and said pulverizer for returning solid particles separated in said separator to said pulverizer and back to said combustion chamber.

2. A heat-transfer plant comprising a pulverized fuel fired combustion chamber in which hot gases are produced, a plurality of heat consuming means connected to said combustion chamber and receiving hot gases therefrom for their operation, dust separators adapted to separately remove coarse and fine solid particles of fly ash and unburnt coal and coke from said gases, said separators being interposed between said heat consuming means with respect to the gas flow for removing solid particles of different size from said gases after their temperature has been reduced in one of said means and before they enter another of said means, a pulverizer connected to said combustion chamber for pulverizing and delivering fuel for firing said combustion chamber, and a conduit connecting that one of said dust separators which removes the coarse particles with said pulverizer for returning the coarse particles to said pulverizer to be ground once more.

WALTER GUSTAV NOACK.